United States Patent
Hirai

(10) Patent No.: US 6,379,115 B1
(45) Date of Patent: Apr. 30, 2002

(54) WINDMILL AND WINDMILL CONTROL METHOD

(76) Inventor: Tetsuo Hirai, 2-93 Sakuragicho, Wakaba-ku, Chiba-shi Chiba-ken 264-0022 (JP)

(*) Notice: Subject to any disclaimer, the term of this patent is extended or adjusted under 35 U.S.C. 154(b) by 0 days.

(21) Appl. No.: 09/619,472

(22) Filed: Jul. 19, 2000

(30) Foreign Application Priority Data

Aug. 2, 1999 (JP) .......................................... 11-219135

(51) Int. Cl.$^7$ ................................................ F03D 3/00
(52) U.S. Cl. .......................... 416/17; 416/37; 416/40; 416/61; 416/111; 416/119; 416/155
(58) Field of Search ............................ 415/4.2, 4.4, 14, 415/19, 47, 48, 118; 416/17, 37, 40, 61, 111, 119, 155; 290/44, 55

(56) References Cited

U.S. PATENT DOCUMENTS

| | | | | |
|---|---|---|---|---|
| 3,902,072 A | * | 8/1975 | Quinn | 290/44 |
| 4,410,806 A | * | 10/1983 | Brulle | 290/44 |
| 4,546,264 A | * | 10/1985 | Pinson | 290/54 |
| 4,609,827 A | * | 9/1986 | Nepple | 290/44 |
| 4,832,569 A | * | 5/1989 | Samuelsen et al. | 416/17 |
| 4,979,871 A | * | 12/1990 | Reiner | 415/4.2 |

FOREIGN PATENT DOCUMENTS

| | | |
|---|---|---|
| JP | A-55-131585 | 10/1980 |
| JP | A-57-372 | 1/1982 |
| JP | A-57-56674 | 4/1982 |
| JP | A-11-117850 | 4/1999 |

* cited by examiner

*Primary Examiner*—Edward K. Look
*Assistant Examiner*—Ninh Nguyen
(74) *Attorney, Agent, or Firm*—Oliff & Berridge, PLC

(57) ABSTRACT

A windmill includes a freely rotatable revolution shaft, a plurality of pairs of pivotal support rods provided at the revolution shaft, and wind receiving blades respectively and rotatably set between the pivotal support rods with wind receiving blade shafts. The windmill is applied to the driving of a lifting pump, a generator and the like by employing revolution driving force. An anemometer/anemoscope measures wind velocity and direction. A servo motor controls the direction of the wind receiving blades based on the detected velocity and direction. Various methods of control are also provided.

4 Claims, 7 Drawing Sheets

WINDMILL AND WINDMILL CONTROL METHOD

BACKGROUND OF THE INVENTION

1. Field of the Invention

The present invention relates to a windmill consisting of a freely rotatable revolution shaft, a plurality of pairs of pivotal support rods provided at the revolution shaft, and wind receiving blades respectively and rotatably set between the pivotal support rods with wind receiving blade shafts. The windmill is applied to the driving of a lifting pump, a generator and the like by employing revolution driving force.

2. Prior Art

As windmills of this type, there have been hitherto known those disclosed by, for example, Japanese Patent Unexamined Application Publication Nos. 55-131585, 57-372, 57-56674 and 11-117850.

Japanese Patent Unexamined Application Publication No. 55-131585 discloses the structure of a windmill which consists of a plurality of blades rotating on their own shafts and revolving around a revolution main shaft, gears provided at the rotary shafts of these blades, respectively and gears provided at the main shaft of the windmill. The gears are coupled to one another by planetary gears or chains.

Japanese Patent Unexamined Application Publication No. 57-372 discloses the structure of a windmill which consists of a pair of wind receiving blades provided symmetrically, rotatably around a revolution main shaft, rotation shafts extending from the central positions on the lower ends of the wind receiving blades, respectively, gears provided at the rotation shafts, respectively, a gear provided on the lower portion of the revolution main shaft and a rudder provided at the gear. The former and latter gears are mutually coupled by a timing belt.

Japanese Patent Unexamined Application Publication No. 57-56674 discloses a windmill wherein a plurality of planetary shafts are revolvably provided around a solar shaft, blades are attached to the plurality of planetary shafts at different angles, respectively, a locking mechanism associated with the solar shaft so as to allow the plurality of planetary shafts to rotate half in the same direction as the revolution direction per revolution is provided, and the revolution forces of the planetary shafts are taken out as outputs.

Further, Japanese Patent Unexamined Application Publication No. 11-117850 discloses a windmill consisting of a rotatable revolution shaft, a plurality of pairs of pivotal support rods provided at the revolution shaft, planetary shaft frames rotatably provided at the pivotal support rods through planetary shafts, respectively and each having a wind receiving means, planetary shaft bevel gears formed on the lower end portions of the respective planetary shafts and a wind direction bevel gear provided on the lower end portion of the revolution shaft. It particularly discloses that a windmill can be made larger in size and can output high power by employing, as the coupling means, a bevel gear shaft having bevel gears on both ends thereof, respectively.

SUMMARY OF THE INVENTION

In each of these conventional windmills, however, a plurality of wind receiving blades which rotate and revolve are mechanically coupled to the revolution shaft. Due to this, the rotation of the wind receiving blades is specified univocally based on their mechanical coupling states and the setting of the rotating positions of the wind receiving blades has been quite restricted.

In recent years, environmental issues are highlighted. In this connection, the reduction of vibration and noise is regarded as a challenge for the windmills. It is, therefore, desired that a windmill itself has a simple structure and mechanical parts thereof such as gears are as simple as possible.

Further, according to each of the conventional windmills, a wind receiving blade is formed as a mechanism rotating through gears or the like. This inevitably leads to a larger windmill and more complex mechanisms.

It is an object of the present invention to overcome the above-stated disadvantages and to realize a highly reliable windmill with the windmill itself having a simple structure.

It is another object of the present invention to provide highly efficient wind receiving blades control by rotating the wind receiving blades in directions most efficient for receiving wind, freely positioning the rotation of the wind receiving blades irrespectively of the revolution of the revolution shaft and allowing the wind receiving blades to freely invert and stop.

The present invention has overcome the above disadvantages by a windmill and a windmill control method described below.

(1) A windmill comprising a rotatable revolution shaft; a plurality of pairs of upper and lower pivotal support rods provided around the revolution shaft; wind receiving blades put between the pairs of pivotal support rods and also respectively and rotatably set between the pairs of pivotal support rods with wind receiving blade shafts; servo motors directly coupled to the wind receiving blade shafts, for freely positioning directions of the wind receiving blades, respectively; wind receiving blade rotating position detectors for detecting rotating positions of the wind receiving blade shafts respectively; revolution shaft revolving position detector for detecting revolving position of the revolution shaft; an anemometer/anemoscope measuring a wind velocity and a wind direction; and a servo motor control section to be input the wind direction and the wind velocity measured by the anemometer/anemoscope and to be input the revolving position of the revolution shaft and then controlling the servo motors to thereby control directions of the wind receiving blades.

(4) A windmill control method in a steady state of controlling directions of wind receiving blades of a windmill consisting of a rotatable revolution shaft, a plurality of pairs of pivotal support rods provided at the revolution shaft and the wind receiving blades respectively and rotatably set between the pairs of pivotal support rods with wind receiving blade shafts by inputting a wind direction and a wind velocity measured by an anemometer/anemoscope and a revolving position of the revolution shaft of the windmill, and also characterized in that an upwind point on a revolution circumference on which the wind receiving blades revolve counterclockwise is set at point C, a point at 90° clockwise from the point C on the revolution circumference is set at point A, and points at 45° intervals from the point A are defined as points B, C and D to thereby define all points on the revolution circumference, with the final point set at a point H, and directions of the wind receiving blades are controlled so that the directions of the wind receiving blades at the point A are parallel to the wind direction, while the windmill revolves once, the wind receiving blades rotate clockwise by a 1/24 turn at the points A to C, the wind receiving blades rotate counterclockwise by a 1/12 turn at the points C to G, and the wind receiving blades rotate clockwise by a 1/24 turn at the points G to A.

(5) A windmill control method in a strong wind state of controlling directions of wind receiving blades of a windmill consisting of a rotatable revolution shaft, a plurality of pairs of pivotal support rods provided at the revolution shaft, a plurality of pairs of pivotal support rods provided at the revolution shaft and the wind receiving blades respectively and rotatably set between the pairs of pivotal support rods with wind receiving blade shafts, by inputting a wind direction and a wind velocity measured by an anemometer/anemoscope and a revolving position of the revolution shaft of the windmill, and also characterized in that an upwind point on a revolution circumference on which the wind receiving blades revolve counterclockwise is set at point C, a point at 90° clockwise from the point C on the revolution circumference is set at point A, and points at 45° intervals from the point A are defined as points B, C and D to thereby define all points on the revolution circumference, with the final point set at a point H, and directions of the wind receiving blades are controlled so that the direction of the wind receiving blades at the point A are parallel to the wind direction, and that while the windmill revolves once, the wind receiving blades rotate clockwise by a 5/24 turn at the points A to C, the wind receiving blades rotate clockwise by a 7/12 turn at the points C to G, and the wind receiving blades rotate clockwise by a 5/24 turn at the points G to A.

(6) A windmill control method in an emergency state such as a gale wind of controlling directions of wind receiving blades of a windmill consisting of a rotatable revolution shaft, a plurality of pairs of pivotal support rods provided at the revolution shaft and the wind receiving blades respectively and rotatably set between the pairs of pivotal support rods with wind receiving blade shafts, by inputting a wind direction and a wind velocity measured by an anemometer/anemoscope and a rotating position of the revolution shaft of the windmill, and also characterized in that a point at 90° clockwise from an upwind point on a revolution circumference on which the wind receiving blades revolve counterclockwise is set at a reference point, and the windmill is controlled so that direction of the wind receiving blades at the reference point is parallel to the wind direction; and the wind receiving blades rotate once clockwise while the windmill revolves once.

DESCRIPTION OF THE INVENTION

First, a windmill according to the present invention will be described hereinafter in detail with reference to the accompanying drawings.

Figure 1:
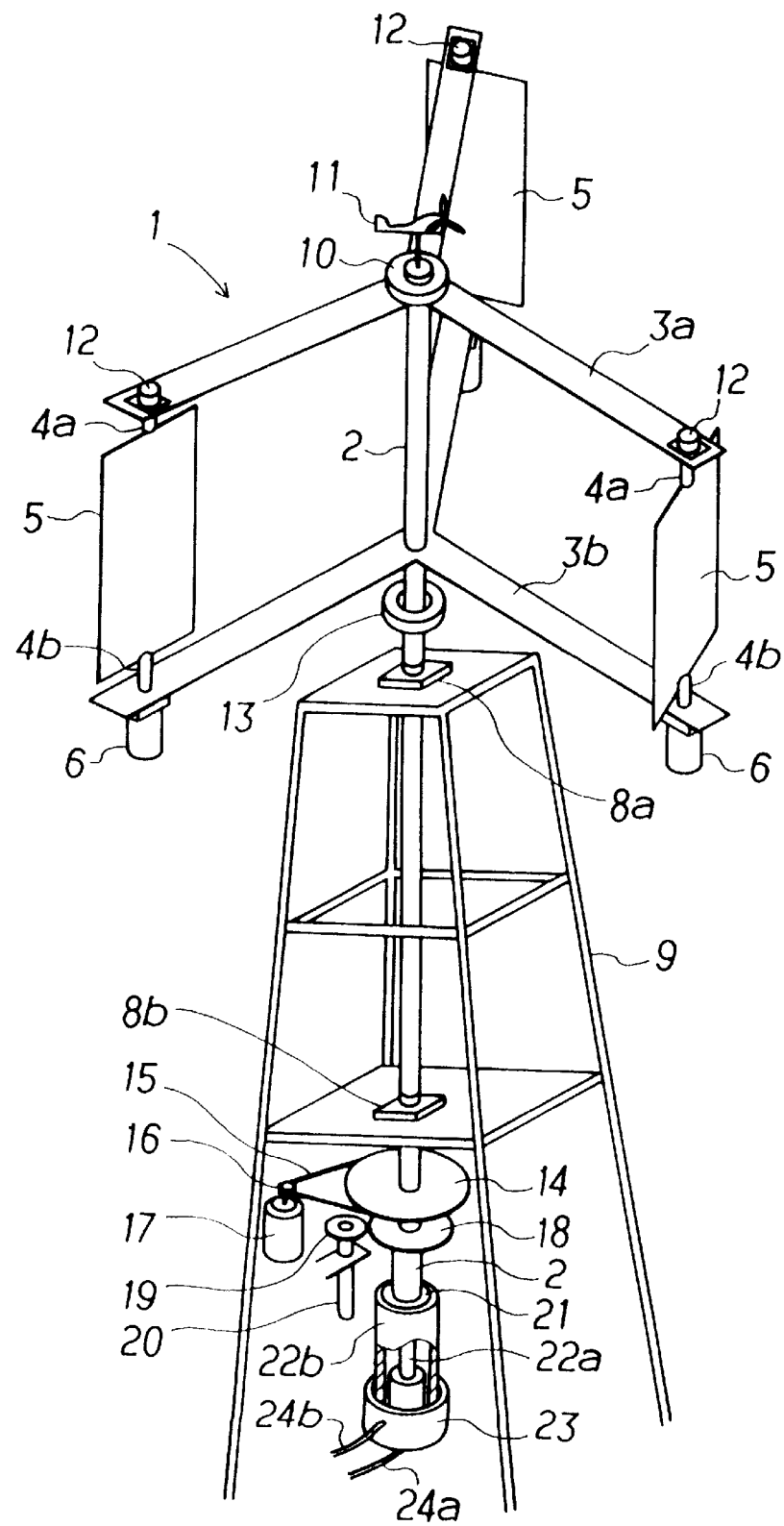
FIG. 1 is a perspective view of a windmill according to the present invention.

In FIG. 1, a windmill 1 is comprised of a revolution shaft 2, a plurality of pairs of upper and lower pivotal support rods 3a and 3b provided around the revolution shaft 2, and wind receiving blades 5 respectively and rotatably set between the pairs of pivotal support rods 3a and 3b with wind receiving blade shafts 4a and 4b. Also, servo motors 6 are fixedly provided on the lower parts of the pivotal support rods 3b of the windmill 1, respectively. The output shaft (not shown in FIG. 1) of each of the servo motors 6 is coupled to the corresponding wind receiving blade shaft 4b so as to be freely controllable over the direction of the corresponding wind receiving blade 5.

The revolution shaft 2 is a hollow shaft with an appropriate length and the important parts thereof are pivotally supported by bearings 8a and 8b. The bearings 8a and 8b, which are fixed to a tower 9, support the overall windmill 1. Required wirings and the like are provided in the hollow revolution shaft 2.

A servo motor control section 10 is provided on the top of the windmill 1. The servo motor control section 10 controls the respective servo motors 6 and the directions of the wind receiving blades 5 based on an input signal to be described later.

The pedestal of an anemometer/anemoscope 11 is fixed to the core of the revolution shaft above the servo motor control section 10. The anemometer/anemoscope 11 is rotatable irrespectively of the revolution of the revolution shaft and constantly outputs a wind velocity signal and a wind direction signal to a computer in the servo motor control section 10.

A wind receiving blade rotating position detector 12 fixed onto each pivotal support rod 3a is coupled to the corresponding wind receiving blade shaft 4a. The detector 12 outputs a rotating position signal on the corresponding wind receiving blade to the computer in the servo motor control section 10. Further, a revolution position signal on the revolution shaft 2 is outputted to the computer in the servo motor control section 10 from a revolution shaft revolving position detector 13.

A pulley 14 is provided at the lower side of the revolution shaft 2. The pulley 14 rotates a pulley 16 through a belt 15 and drives a generator 17 coupled thereto to generate power. The power generated by the generator 17 is supplied to the servo motor control section 10 through an insulating container 23 to be described later. The power is mainly used for windmill control.

Further, a spur gear 18 is provided at the revolution shaft 2 and coupled to an output shaft 20 through a spur gear 19 engaged with the output shaft 20. An output device such as a generator, a lifting pump or the like, which is not shown therein, is coupled to the output shaft 20.

A rod-like electrode 22a and a cylindrical electrode 22b on the outer periphery of the electrode 22a are attached to an electric insulator 21 on the lowest portion of the revolution shaft 2. The electrodes 22a and 22b are respectively dipped in an insulating container 23 divided to each other by two chambers which are half filled with mercury.

The electrodes 22a and 22b are provided so that the rotation centers thereof are coincident with the central axis of the revolution shaft 2. Thus, the electrodes can receive power externally without influence of the revolution of the revolution shaft 2. Although FIG. 1 shows only two electrodes, it is possible to facilitate transmission of signals externally to the computer in the servo motor control section 10 by increasing the number of rotating electrodes.

The electrodes receives external power through cables 24a and 24b. In a preferred embodiment, the power received through the cables 24a and 24b means power generated by the generator 17 connected to the revolution shaft 2 of the windmill 1. The present invention should not be, however, limited thereto. Needless to say, power can be supplied from a commercial power source. It is also possible to employ a slip ring or the like instead of the electrodes 22a, 22b and the insulating container 23 filled with mercury.

Next, description will be given to electrical control over the windmill.

Figure 2:
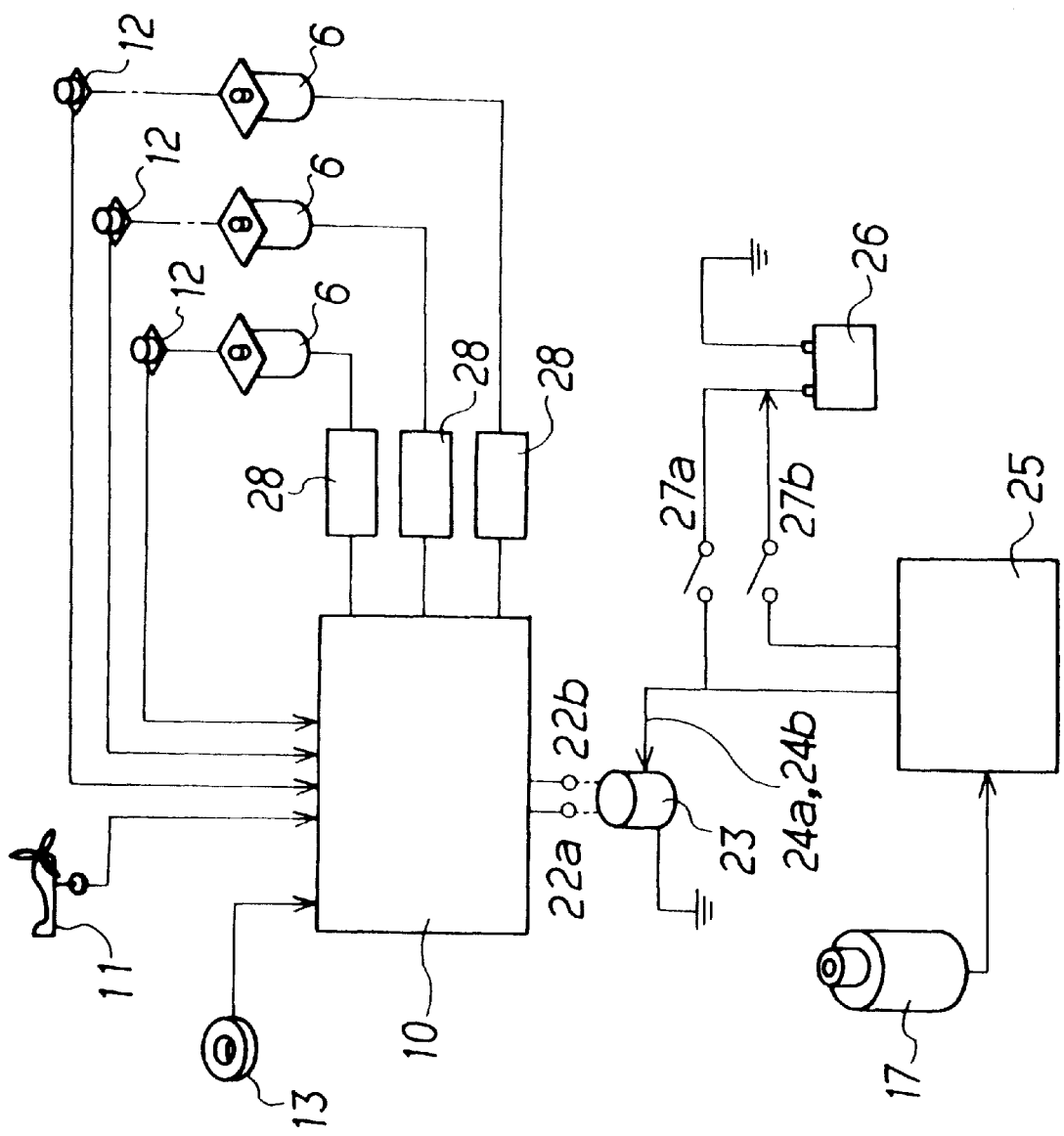
FIG. 2 is a block diagram of a control system controlling wind receiving blades of the windmill according to the present invention.

FIG. 2 is a block diagram of the control system. As shown therein, the voltage of the power generated by the generator 17 is regulated by a voltage regulator 25 to thereby rectify the power. Since the cables 24a and 24b are connected to the voltage regulator 25, the rectified power is fed to the servo motor control section 10 by way of the insulating container 23 and the electrodes 22a and 22b.

A storage battery 26 connected to the servo motor control section 10 through switches 27a and 27b is employed as auxiliary power. At the start of the windmill 1, in particular, the switch 27a is automatically switched on by an external command signal and a command signal from computer, whereby power is supplied from the storage battery 26 to the servo motor control section 10 and the servo motor is controlled at the start of the windmill 1.

In this case, it is preferable that the storage battery 26 can be automatically charged. Namely, while the windmill 1 is in operation, the switch 27b may be turned on/off as required and the battery 26 may be automatically charged as required.

A wind velocity signal and a wind direction signal are constantly inputted to the servo motor control section 10 from the anemometer/anemoscope 11. In addition, rotating position signals on the wind receiving blades 5 (not shown in FIG. 2) each of which rotation is controlled by the corresponding servo motor 6, are inputted to the servo motor control section 10 from the wind receiving blade rotating position detectors 12. A revolving position signal on the revolution shaft 2 (not shown in FIG. 2) is also inputted thereto from the revolution shaft revolving position detector 13. Based on these inputted signals, the servo motor control section 10 issues commands to servo units 28, and controls the rotation of each servo motor 6 and the wind receiving blades 5 adaptively to the circumstances.

Next, description will be given to a control method of controlling the directions of the wind receiving blades in detail.

Figure 7:
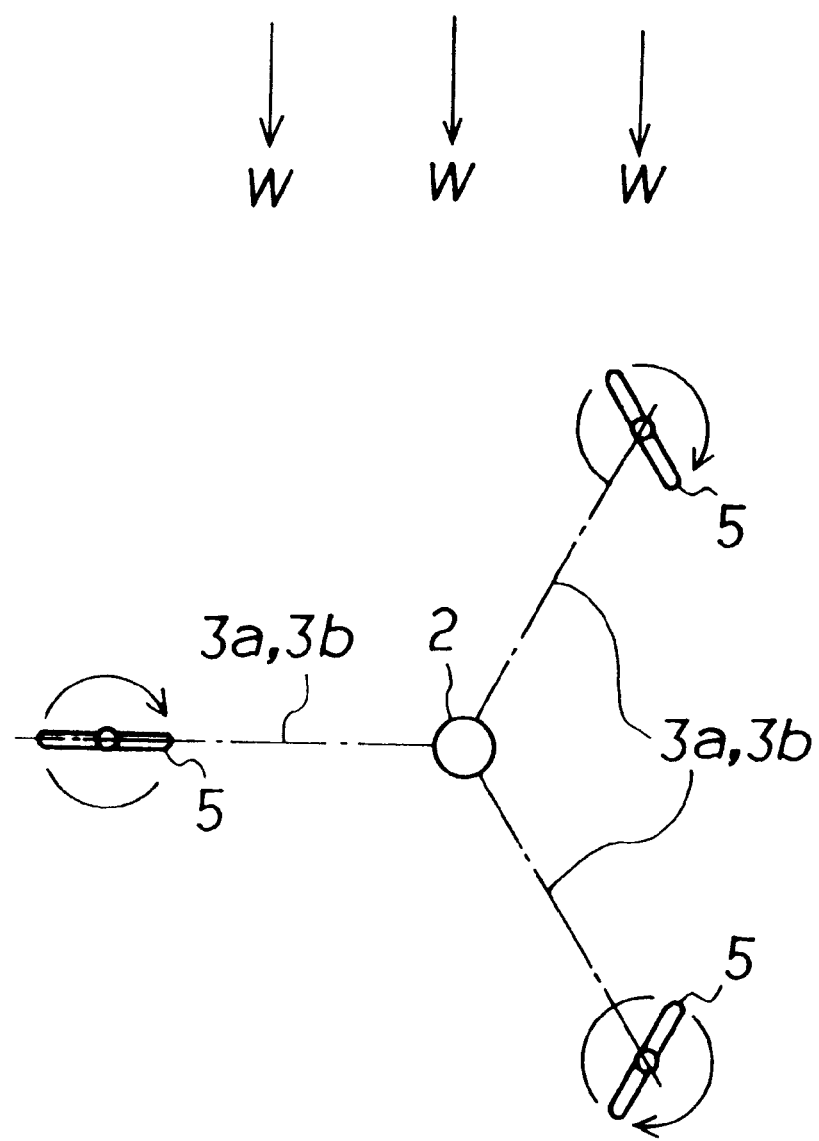
FIG. 7 is a typical view for describing the exemplified arrangement of the wind receiving blades of the windmill according to the present invention.

FIG. 7 is a typical view showing the relationship between the revolution shaft 2 and the wind receiving blades 5.

In FIG. 7, as the most preferable arrangement of the wind receiving blades 5, an example of providing the wind receiving blades 5 with three pairs of pivotal support rods 3a and 3b arranged about the revolution shaft 2 at intervals of 120°. Therefore, the following description will be given while taking three wind receiving blades as an example. The present invention should not be limited thereto and the number of wind receiving blades can be appropriately determined.

First, based on FIG. 3, description will be given to a direction in which each wind receiving blade 5 should take at the respective positions on the revolution circumference during low-velocity operation at the start of the windmill 1.

It is assumed that wind blows in W direction and wind velocity is normal.

To simplify description, positions of the wind receiving blades on the revolution circumference are allotted names. While assuming that each wind receiving blade 5 receives wind and revolves counterclockwise, an upwind position on the revolution circumference is set at point C. The position at 90° clockwise from the position C on the revolution circumference is set at point A. Then, positions at intervals of 45° counterclockwise from point A are set at points B, C etc. In this way, the respective points with respect to the wind direction are set. A position at 315° counterclockwise from point A, i.e., at 45° clockwise from point A is, therefore, set at point H.

The names of these points allotted with reference to the upwind point will be described hereinafter, while assuming that the same points are allotted the same names.

At the start of the windmill, the wind receiving blades need to receive wind as efficiently as possible. At point A upwind, the wind receiving blade is preferably in the direction parallel to the wind direction so as to minimize the influence of the wind by making a wind pressure area the smallest to prevent a torque from occurring. On the other hand, at point E downwind, the wind receiving blade is preferably in the direction orthogonal to the wind direction so as to receive the wind most efficiently.

At points C and G, the wind receiving blades are preferably in the direction at 45° and 135° from the wind direction, respectively so that the windmill can receive wind and rotate most efficiently.

The wind receiving blades at the start of the windmill as stated above can be controlled by setting a control pattern in which the wind receiving blade at point A is in a direction parallel to the wind direction and the wind receiving blade rotates half clockwise as the windmill revolves around the shaft 2 once.

If controlled according to the above pattern, the wind receiving blade 5 is parallel to the wind direction W and the influence of wind pressure on the blade 5 is minimum at point A, a torque due to wind pressure begins to occur to the blade 5 in front of point B, and when the blade 5 is at an angle of 45° with respect to the wind direction W, the blade is applied with 70% of wind pressure and about 35% of the torque occurs at point C.

Further, at the start of the windmill, the wind receiving blades 5 do not revolve about the revolution shaft 2. As a result, at point E, the wind pressure and torque applied to the blade 5 is 100%, thereby improving the starting property of the windmill.

When the revolution shaft 2 revolves, the wind pressure and the torque acts to the direction for the composition vector of both the windmill velocity and wind velocity.

Therefore during revolving, the wind receiving blade 5 is applied with less wind pressure and torque at point G and C than ones when the wind receiving blades 5 do not revolve.

Thereafter, the wind receiving blade decreases the wind pressure and torque applied to the blade and returns from point G to point A. In this way, the wind receiving blades are controlled to rotate at low velocity at the start of the windmill.

Figure 4:
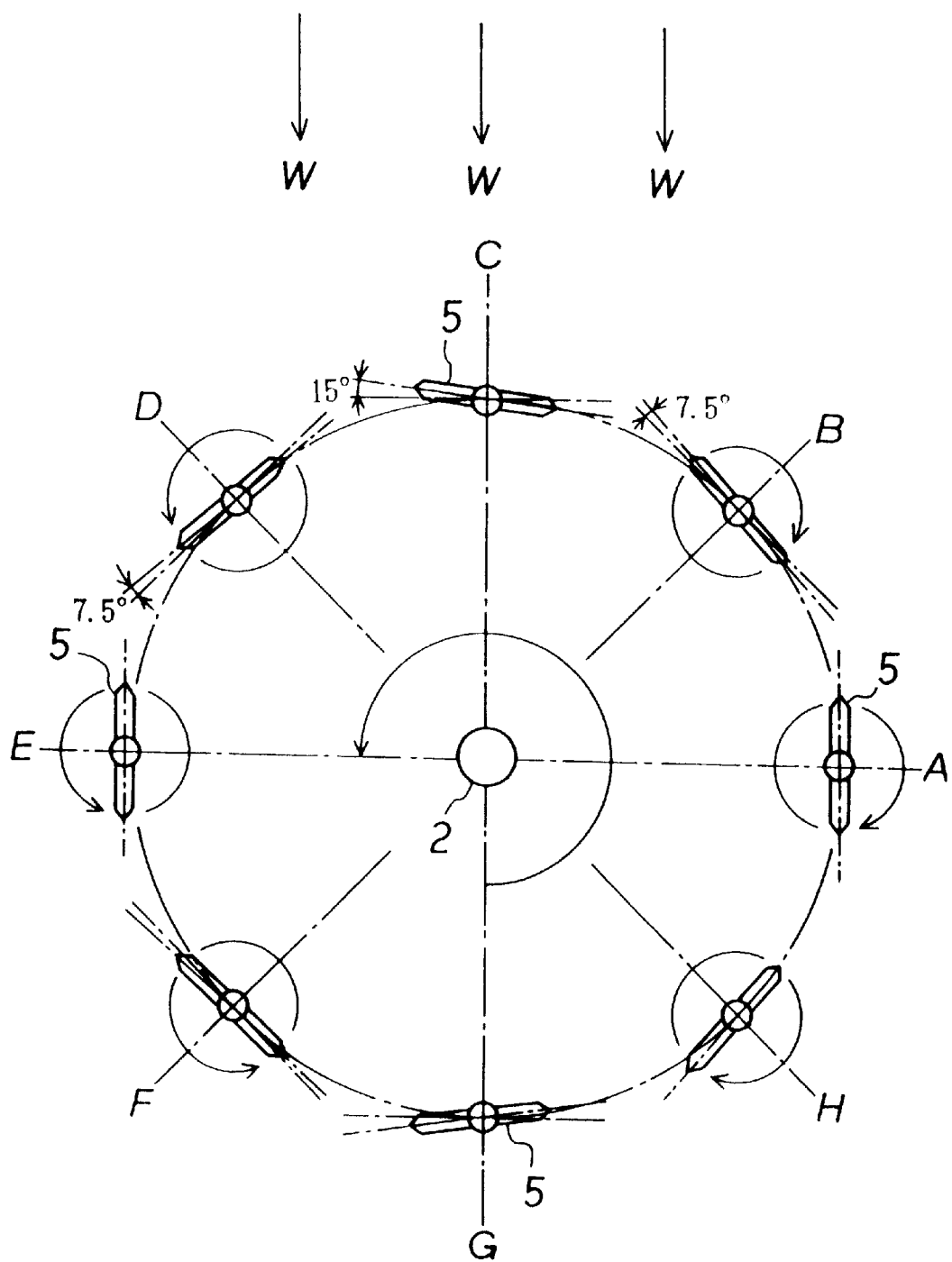
FIG. 4 is a typical view for describing the directions of the wind receiving blades in a steady state.

Next, description will be given to control over the windmill in a steady-state operation with normal wind velocity after the start of the windmill based on FIG. 4.

In a steady-state operation, the windmill already rotates and it is, therefore, necessary to efficiently maintain the rotation. Due to this, excessively high wind pressure is prevented from being applied to the wind blades so as to maintain stable revolution.

Specifically, the rotating operation is controlled as follows. The direction of the wind receiving blade at point A is set parallel to wind direction and the wind pressure area thereof is minimized to prevent a torque from occurring. Thereafter, as the windmill revolves once counterclockwise, the wind receiving blades rotate clockwise by a 1/24 turn at points A to C, by a 1/12 turn counterclockwise at points C to G and by a 1/24 turn clockwise at points G to A. That is, when the windmill revolves at a wind receiving side from points C through E to G, the wind receiving blades are controlled to rotate counterclockwise by a 1/12 turn relative to one revolution of the windmill. When the windmill revolves at a side against the wind from points G through A to C, the wind receiving blades are controlled to rotate clockwise by a 1/12 turn relative to one revolution of the windmill. In other words, the present invention is characterized by inverting the rotating direction of the wind receiving blades at points C and G. The inversion control cannot, however, avoid causing error derived from inertia or the like since the servo motors control the rotation of the corresponding wind receiving blades. For example, it is ideal to invert the rotating direction of the wind receiving blades at points C and G. In actual control, however, taking potential error into account, the servo motors may be stopped in front of the points C and G and the rotating directions may be inverted. In that case, error of about ±1° of the direction angle of the wind receiving blade is sufficiently allowable.

In this control operation, the torque applied to the wind receiving blades become the highest at points C and G.

Figure 5:
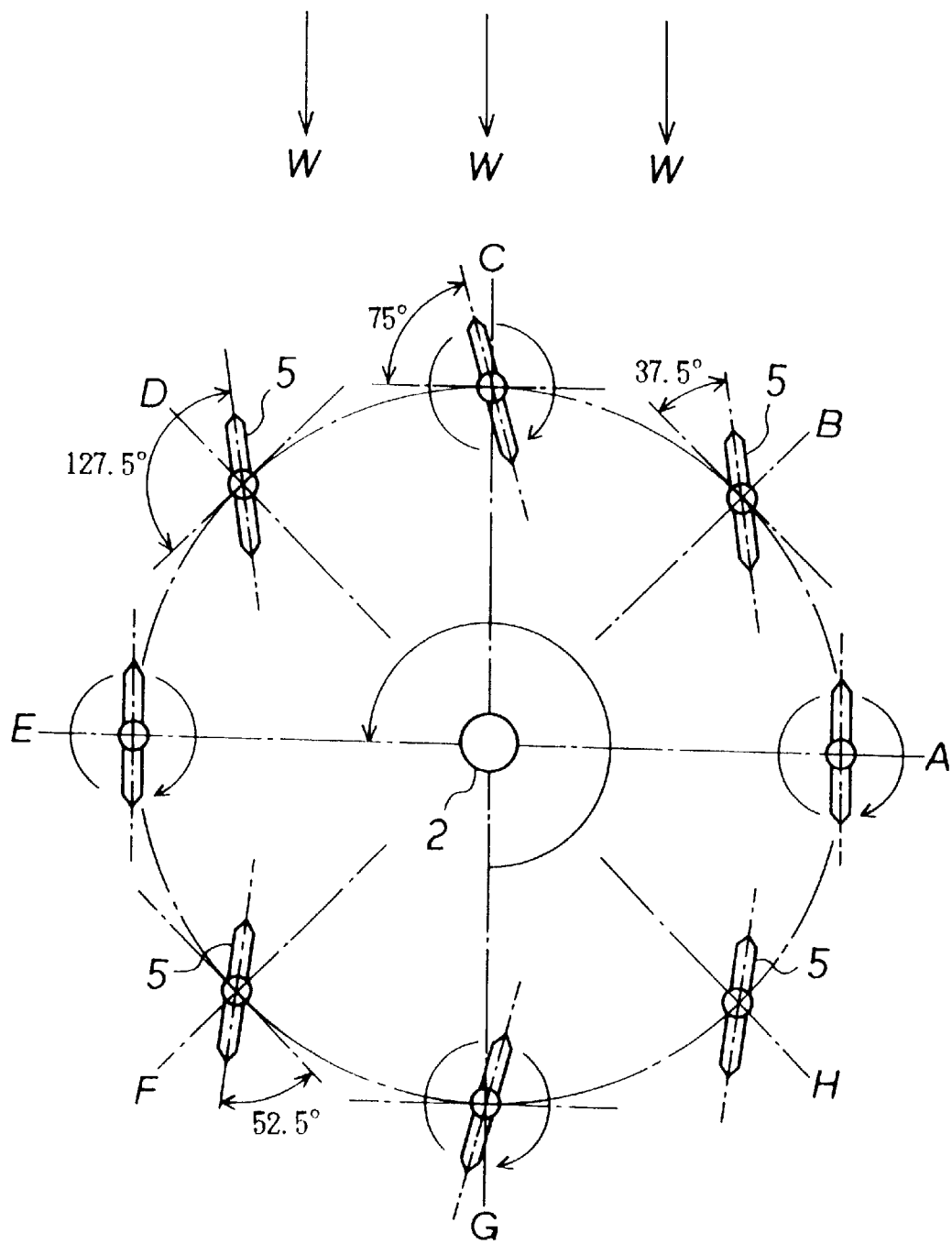
FIG. 5 is a typical view for describing the directions of the wind receiving blades in a strong wind state.

Next, FIG. 5 is a typical view for describing a method of controlling the windmill in a strong-wind state.

When wind is strong, the direction of the wind receiving blade is controlled to be constantly nearly parallel to the wind direction to make the wind pressure and torque applied to the wind receiving blade as low as possible.

To be specific, the direction of the wind receiving blade at point A is set parallel to the wind direction. As the windmill revolves once, the wind receiving blade is controlled to rotate by a 5/24 turn clockwise at points A to C, by a 7/12 turn clockwise at points C to G and by a 5/24 turn clockwise at points G to A. In other words, while the rotation directions of the wind receiving blade is constantly clockwise, the rotating velocity is controlled such that the wind receiving blade rotates by 7/12 relative to one revolution of the windmill when the windmill revolves at a wind receiving side from points C through E to G, and by a 5/12 turn relative to one revolution when the windmill revolves at a side against the wind from points G through A to C.

Figure 6:
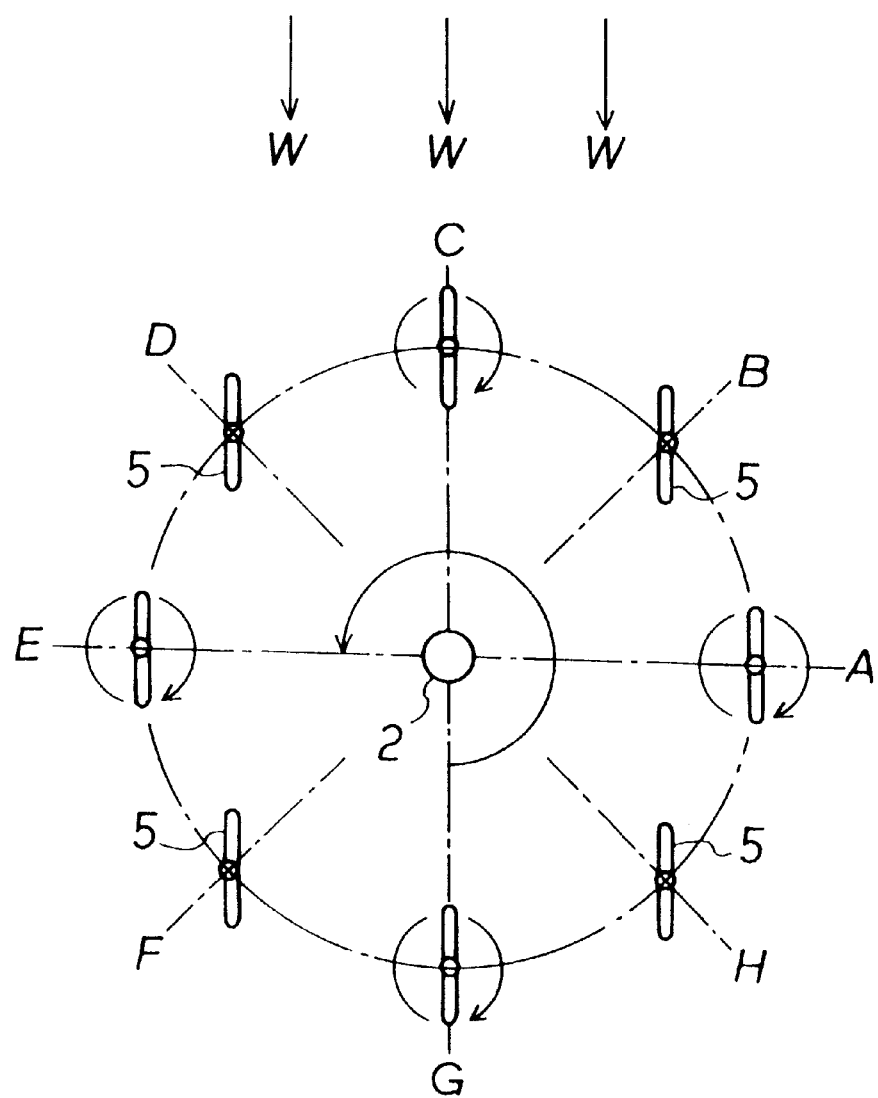
FIG. 6 is a typical view for describing the directions of the wind receiving blades in an emergency state such as a gale wind.

In an emergency in which gale wind howls, however, it is preferable to control the direction of the wind receiving blade to be constantly parallel to wind direction, as shown in FIG. 6.

To be specific, the direction of the wind receiving blade is set parallel to the wind direction at point A and the wind receiving blade is controlled to rotate once clockwise as the windmill revolves once. By controlling so, the windmill can be almost stopped in an emergency and there is no fear of applying excessive load to the windmill.

Figure 3:
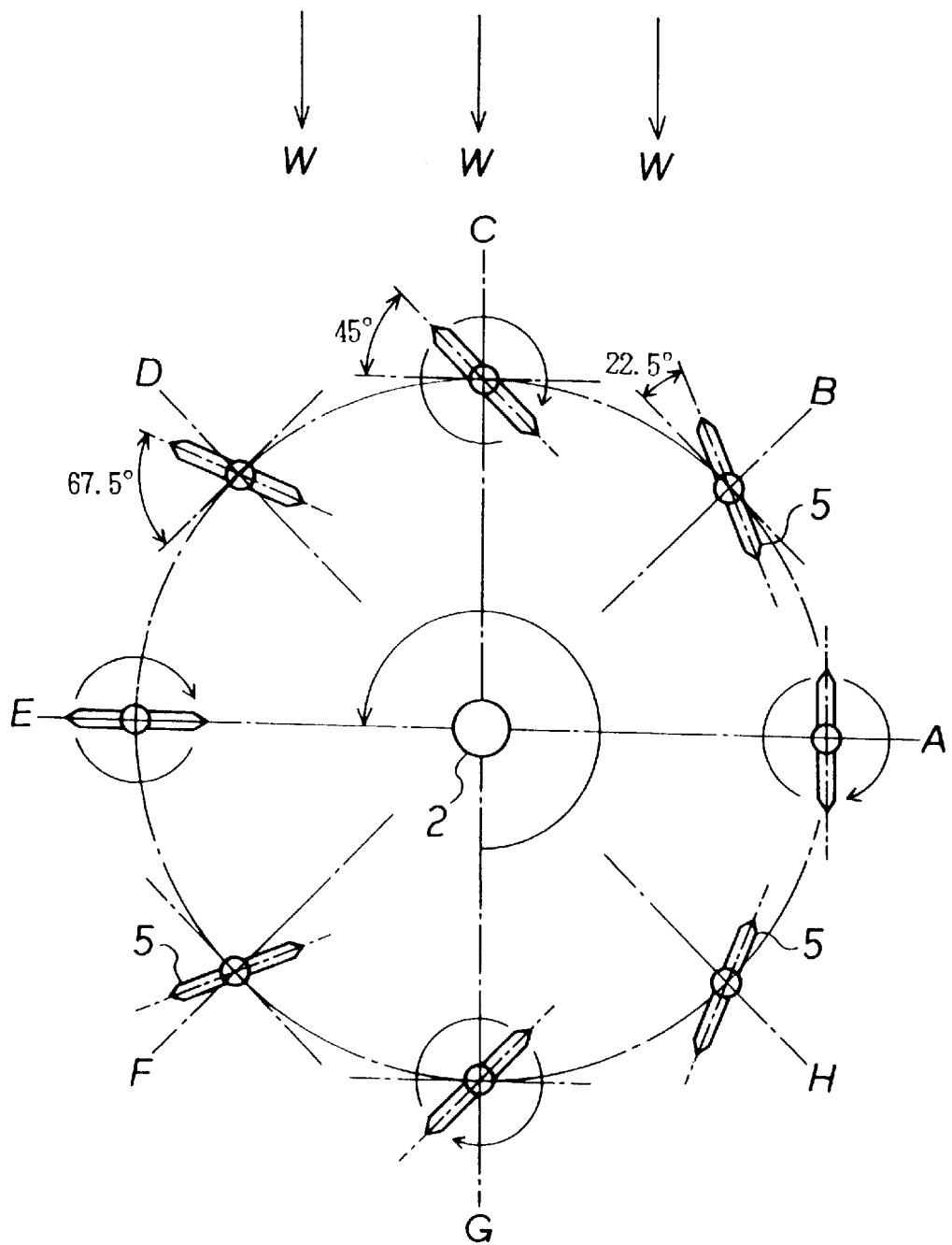
FIG. 3 is a typical view for describing the directions of wind receiving blades when the windmill is started.

In steady-state operation, it is possible to maintain the revolution of the windmill at low velocity without excessively accelerating the rotation thereof by applying the control in low-velocity operation at the start of the windmill as described in FIG. 3 to control over the wind receiving blades. In that case, the windmill according to the present invention is controlled appropriate for equipment, such as a lifting pump, which requires a torque even at low velocity.

The embodiment has been described while assuming that the revolution of the wind receiving blades which is the revolving direction of the windmill is counterclockwise. It goes without saying that the direction may be clockwise.

According to the present invention, the servo motors are attached to the wind receiving blade shafts, respectively, to allow the wind receiving blades to be rotatable and the rotating velocity of the wind receiving blades can be changed, inverted and stopped. It is, therefore, possible to realize windmill control in accordance with the change of the wind velocity. As a result, it is possible to realize a highly reliable windmill with a simple structure and to make good use of wind force.

I claim:

1. A windmill comprising:

a rotatable revolution shaft;

a plurality of pairs of upper and lower pivotal support rods provided around the revolution shaft;

wind receiving blades put between the pairs of pivotal support rods and also respectively and rotatably set between the pairs of pivotal support rods with wind receiving blade shafts;

servo motors directly coupled to said wind receiving blade shafts, for freely positioning directions of the wind receiving blades, respectively;

wind receiving blade rotating position detectors for detecting rotating positions of said wind receiving blade shafts, respectively;

revolution shaft revolving position detector for detecting revolving position of the revolution shaft;

an anemometer/anemoscope measuring a wind velocity and a wind direction; and a servo motor control section to be input the wind direction and the wind velocity measured by the anemometer/anemoscope and to be input the revolving position of the revolution shaft and then controlling said servo motors to thereby control directions of the wind receiving blades.

2. A windmill control method in a steady state of controlling directions of wind receiving blades of a windmill consisting of a rotatable revolution shaft, a plurality of pairs of pivotal support rods provided at the revolution shaft and the wind receiving blades respectively and rotatably set between the pairs of pivotal support rods with wind receiving blade shafts, by inputting a wind direction and a wind velocity measured by an anemometer/anemoscope and a revolving position of the revolution shaft of the windmill, and thereby controlling directions of the wind receiving blades, wherein, an upwind point on a revolution circumference on which said wind receiving blades revolve counterclockwise is set at point C, a point at 90° clockwise from the point C on the revolution circumference is set at point A, and points at 45° intervals from the point A are defined as points B, C and D to thereby define all points on the revolution circumference, with the final point set at a point H, directions of the wind receiving blades are controlled so that the directions of the wind receiving blades at the point A are parallel to the wind direction, and that while the windmill revolves once, the wind receiving blades rotate clockwise by a 1/24 turn at the points A to C, the wind receiving blades rotate counterclockwise by a 1/12 turn at the points C to G, and the wind receiving blades rotate clockwise by a 1/24 turn at the points G to A.

3. A windmill control method in a strong wind state of controlling directions of wind receiving blades of a windmill consisting of a rotatable revolution shaft, a plurality of pairs of pivotal support rods provided at the revolution shaft and the wind receiving blades respectively and rotatably set between the pairs of pivotal support rods with wind receiving blade shafts, by inputting a wind direction and a wind velocity measured by an anemometer/anemoscope and a revolving position of the revolution shaft of the windmill, and thereby controlling direction of the wind receiving blades, wherein an upwind point on a revolution circumference on which said wind receiving blades revolve counterclockwise is set at a point C, a point at 90° clockwise from the point C on the revolution circumference is set at point A, and points at 45° intervals from the point A are defined as points B, C and D to thereby define all points on the revolution circumference, with the final point set at a point H, directions of the wind receiving blades are controlled so that the directions of the wind receiving blades at the point A are parallel to the wind direction, and that while the windmill revolves once, the wind receiving blades rotate clockwise by a $5/24$ turn at the points A to C, the wind receiving blades rotate clockwise by a $7/12$ turn at the point C to G, and the wind receiving blades rotate clockwise by a $5/24$ turn at the points G to A.

4. A windmill control method in an emergency state such as a gale wind of controlling directions of wind receiving blades of a windmill consisting of a rotatable revolution shaft, a plurality of pairs of pivotal support rods provided at the revolution shaft and the wind receiving blades respectively and rotatably set between the pairs of pivotal support rods with wind receiving blade shafts, by inputting a wind direction and a wind velocity measured by an anemometer/anemoscope and a revolving position of the revolution shaft of the windmill, and thereby controlling directions of the wind receiving blades, wherein a point at 90° clockwise from an upwind point on a revolution circumference on which said wind receiving blades revolve counterclockwise is set a reference point, the windmill is controlled so that direction of the wind receiving blades at the reference point is parallel to the wind direction; and the wind receiving blades rotate once clockwise while the windmill revolves once.

* * * * *